Patented Dec. 1, 1925.

1,563,682

UNITED STATES PATENT OFFICE.

JESSE BRYTE BARNITT, OF JAMAICA, NEW YORK, ASSIGNOR OF ONE-HALF TO RALPH H. McKEE, OF NEW YORK, N. Y.

TREATMENT OF CHOCOLATE.

No Drawing.　　Application filed July 26, 1922.　Serial No. 577,697.

*To all whom it may concern:*

Be it known that I, JESSE BRYTE BARNITT, a citizen of the United States, residing at Jamaica, in the county of Queens and State of New York, have invented certain new and useful Improvements in the Treatment of Chocolate, of which the following is a specification.

This invention relates to treatment of chocolate, and more particularly to a method of bleaching coating chocolate used in making candy.

In the manufacture of sweet chocolate, such as is used for coating candies, there are several grades whose apparent difference is essentially that of color, each being made of the same ingredients. Ground, roasted cocoa nib, sugar and cocoa butter are used in the manufacture of coating chocolate. To obtain the lighter colored products, it is necessary to add an additional amount of cocoa butter, which is the most expensive constituent, and sugar. Ground cocoa nib at ordinary temperatures is solid, but when heated, forms a viscous liquid known in the trade by the name of "liquor".

Various attempts have been made to bleach this "liquor" or the coating chocolate obtained therefrom and thus reduce the cost of manufacturing a light colored product. It has been proposed to employ sulfur dioxid, ozone, calcium hypochlorite, potassium permanganate and similar chemicals, but such attempts have been unsuccessful, either failing to bleach the material or leaving an undesirable flavor in the product which cannot be eliminated.

A typical dark coating consists of substantially 100 pounds of liquor, 100 pounds of sugar, and from 25 to 30 pounds of cocoa butter. To obtain the more desired lighter coating, it is customary to use substantially 20 pounds of liquor, 170 pounds of sugar, and 85 pounds of cocoa butter. As cocoa butter is by far the most expensive constituent of the product, and the apparent purpose in use of an excess in the making of chocolate coating being to lighten the color, it is apparent that a successful process for bleaching the roasted cocoa nib, either before or after grinding, would be a material advance in the art, as it would reduce the amount of expensive cocoa butter necessary in the coating, and would permit the production of a light colored coating that would be less sweet than the present coating which requires such a large amount of sugar.

I have found that hydrogen peroxide may be employed to bleach cocoa nib or the prepared chocolate coating and will produce a light colored product without effecting the taste or odor of the material. The hydrogen peroxide may be employed either in a neutral water solution or a slightly alkaline or slightly acid solution. Only sufficient alkali or acid is necessary to produce a solution that will distinctly show with litmus.

In the preferred embodiment of the invention, a slightly alkaline solution of hydrogen peroxide is employed, the small amount of alkali serving to speed up the bleaching operation. The treatment may be applied to the whole, roasted, cocoa nib (the kernel with the shell removed) to the nib after cracking into pieces commonly called "cracked" nib, or to the chocolate liquor which is the cracked, roasted nib after being ground under heavy rolls. As stated, this liquor is solid at ordinary temperatures but begins to liquefy at 100° F. If the liquor is hydraulically pressed between cloths or handled in a filter press, the cocoa butter is largely expressed out from the hot liquor and there is left a product known in the trade as "cocoa powder". The bleach may be applied to this cocoa powder instead of the nib or liquor, in which case it would be necessary to add an amount of cocoa butter before the coating chocolate is made up to replace the cocoa butter originally in the cocoa nib. As stated, the cocoa nib, cracked nib, ground nib, chocolate liquor, or cocoa powder is treated directly with the hydrogen peroxide solution which may be either neutral, alkaline or acid. I prefer to employ an alkaline solution and to treat the roasted, cracked nib with a slightly alkaline solution of hydrogen peroxide of substantially 2 to 3 per cent strength at a temperature of from 70 to 80° F. The cocoa nib is placed in the solution, allowed to stand for a period of from 10 to 15 hours, the residual solution drawn off, and the nib washed with a small amount of water. The cracked, treated nib may then be dried by a current of air and the chocolate liquor formed in the usual manner. As stated, this bleached material may be employed in the proportions generally employed for dark coating, using a minimum amount of cocoa butter and sugar to produce a light coating. The light coating may be thus produced at materially less expense and is not open to the objection of being too sweet.

The hydrogen peroxide filtrate may then be restored by adding sufficient hydrogen peroxide to obtain a solution of the original strength and may then be employed in again practicing the process. The process provides a whole flavored chocolate product with no odor or flavor due to the bleaching process and with no residual constituent of the bleaching material remaining in the chocolate.

While I have described in detail the preferred practice of my process, it is to be understood that the details of procedure may be widely varied without departing from the spirit of the invention or the scope of the subjoined claims.

Having thus described my invention, I claim:

1. The method of bleaching chocolate which consists in subjecting cocoa nib to the action of a solution of hydrogen peroxide, and then removing the cocoa nib from the solution.

2. The method of bleaching chocolate which consists in subjecting roasted cocoa nib to the action of a solution of hydrogen peroxide of substantially 2 per cent to 3 per cent strength.

3. The method of bleaching chocolate which consists in subjecting roasted cocoa nib to the action of a slightly alkaline solution of hydrogen peroxide, and then removing the cocoa nib from the solution.

4. The method of bleaching chocolate which consists in subjecting cocoa nib to the action of a solution of hydrogen peroxide for a period of 10 to 15 hours, removing the cocoa nib from the solution, washing, and drying.

5. The method of bleaching chocolate which consists in subjecting cocoa nib to the action of a solution of hydrogen peroxide of from 2 per cent. to 3 per cent strength, removing the material from the solution, washing, and drying.

6. The method of bleaching chocolate which consists in subjecting roasted, cracked cocoa nib to the action of an alkaline solution of hydrogen peroxide, and then removing the cocoa nib from the solution.

7. The method of bleaching chocolate which consists in subjecting ground cocoa nib to the action of a solution of hydrogen peroxide and then removing the cocoa nib from the solution.

8. The method of bleaching chocolate which consists in subjecting ground roasted cocoa nib to the action of a slightly alkaline solution of hydrogen peroxide, and then removing the cocoa nib from the solution.

9. The method of bleaching chocolate which consists in subjecting ground cocoa nib from which the cocoa butter has been largely expressed to the action of a solution of hydrogen peroxide, and then removing the cocoa nib from the solution.

10. The method of bleaching chocolate which consists in subjecting ground, roasted cocoa nib from which the cocoa butter has been largely expressed, to the action of a slightly alkaline solution of hydrogen peroxide, and then removing the cocoa nib from the solution.

In testimony whereof, I affix my signature.

JESSE BRYTE BARNITT.